Patented Jan. 6, 1948

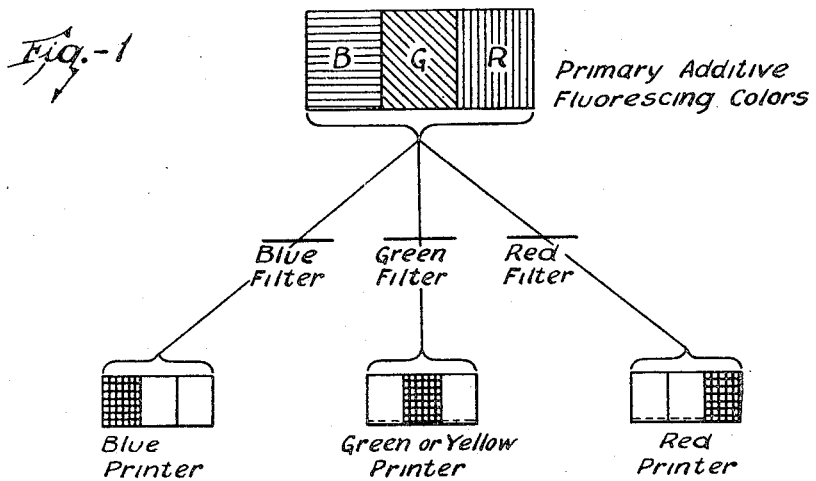
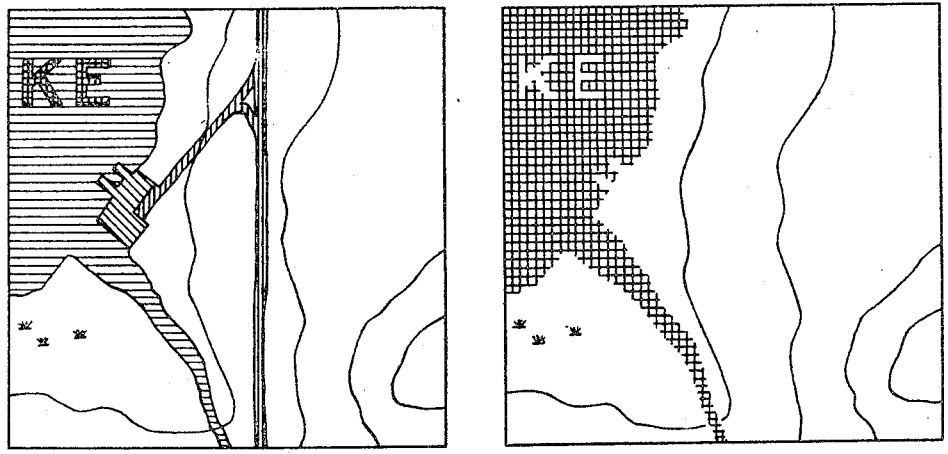

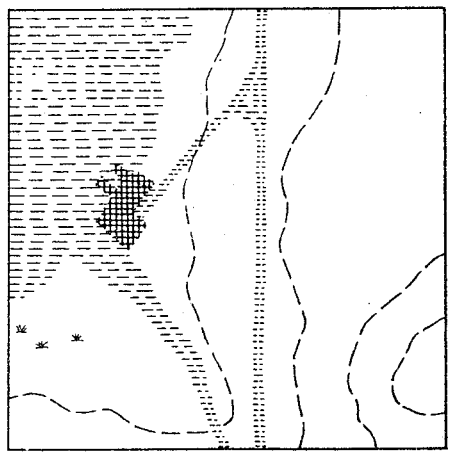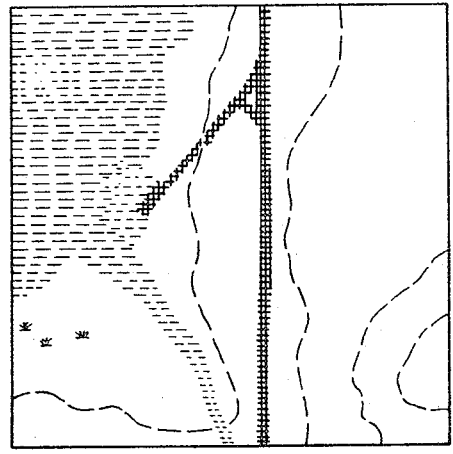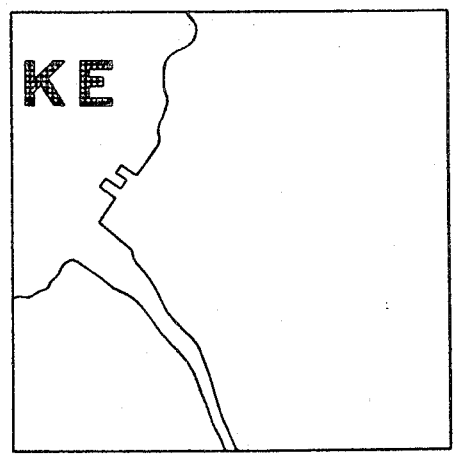

2,434,019

UNITED STATES PATENT OFFICE 2,434,019

COLOR SEPARATION WITH FLUORESCENT MATERIALS

Joseph L. Switzer, Cleveland Heights, and Robert C. Switzer, South Euclid, Ohio

Application March 10, 1942, Serial No. 434,080

17 Claims. (Cl. 95—2)

This invention relates to an improvement in the art of printing and, more particularly, to an improvement in the art of photographically separating colors in an original subject matter to produce printed reproductions of the original subject matter in a plurality of colors. This invention is a continuation-in-part of our improvements in Press-processes of making reproduction impresses and products thereof, disclosed in our copending application, Serial No. 222,676, filed August 2, 1938, Patent No. 2,277,169, granted March 24, 1942, and of our improvements in Printing processes and products thereof, disclosed in our copending application, Serial No. 366,432, filed November 20, 1940, Patent No. 2,302,645, granted November 17, 1942.

Heretofore, the colored reproduction in a plurality of colors of an original rendering has been carried on by rendering the original in conventional mediums, such as water colors, oils, inks, crayons, or the like, which exhibit color under white light by a "subtractive" or "reflection and absorption" effect; that is, such conventional mediums exhibit color by selectively absorbing certain wave-bands of the incident light and reflecting other wave-bands. By photographing the original rendering under strong white light and interposing suitable color filters, usually at the lens of the camera, films or plates (hereinafter referred to as color printers) were obtained for each of the colors to be printed in the reproduction. Before satisfactory printing plates could be obtained from the color printers by suitable photo-mechanical processes, the separate color printers had to be carefully and painstakingly retouched by highly skilled artisans.

There were two principal obstacles to obtaining accurate and sharp color printers by the methods employed in the prior art, which methods required the expensive and time consuming retouching operations. First, the chromatic agents in the subtractive mediums of the original rendering are not monochromatic. That is, any chromatic agent in the medium of the original rendering will reflect a substantial portion of the incident white light other than the wave band of the predominant color of the chromatic agent. For example, a blue pigment from which sixty percent of the light reflected is blue light is regarded commercially as an excellent "pure" blue pigment. Second, it is well-known that different wave bands or "colors" of visible light photograph at different speeds.

Because of the foregoing two obstacles, sharp color printers which require no retouching were not generally obtained regardless of whether direct or complementary color filters were used to separate the colors in an original rendering photographed under visible light. When using a direct color filter, i. e., a filter which theoretically transmits only the color sought to be registered as an image on the color printer, to separate a "slow" color, a certain amount of "fast" color will be transmitted by the filter and recorded on the color printer as fog or a false image which must be removed by retouching. When using a complementary filter to produce a negative of the color image being sought, the complementary color reflected by the color in the color image being sought will expose areas of the color printer which were desired to remain unexposed. Consequently, the color printer had to be retouched to produce a sharp negative. In general, it was preferable to employ complementary color filters, since such complementary filters are intended to filter out only a minor portion, i. e., one color, of the light incident thereto, whereas direct filters are intended to filter out a major portion, i. e., a plurality of colors, of the light incident thereto. Where a system of complementary filters are employed, it has been proposed to overcome the obstacle of different photographic speed of colors by rendering an original from a palette on which all subtractive colors, except the "fastest" color, are "loaded" with fluorescent agents. Thus, by either photographing the original under "mixed" white light and ultra-violet light, or by giving the "loaded" original a first exposure under white light and a second exposure under ultra-violet light, the several colors in the "loaded" original will have an approximately equal or balanced photographic speed. However, whether the "loaded" colors are separated by the "mixed" light or "two-shot" systems, the difficulty in retouching errors in the color printer is merely replaced by the difficulty encountered by the artist in properly "loading" the colors in the original. And in any event, the "loaded" palette does nothing to overcome the first obstacle encountered in photographically separating subtractive colors, namely, the polychromaticity of subtractive colors.

It is the object of our invention to eliminate the first of the above obstacles, the polychromaticity of subtractive colors, and thereby avoid the second obstacle, the differences in photographic speeds of colors. Stated generally, we accomplish this object by rendering the original from mediums which fluoresce brilliantly in visible colors under the influence of invisible fluorescigenous energy (hereinafter referred to as ultra-violet light). The basis for the success of this general method is the utilization of our discovery that certain dyes and pigments will emit only monochromatic visible light when fluorescing under ultra-violet light.

A further object of our invention is to obtain, photographically and without necessity for substantial retouching, clear and sharp color printers. We accomplish this object by photographing under ultra-violet light from which substantially all visible light has been filtered an original rendered in mediums which fluoresce in monochromatic colors. By employing suitable direct color filters, positive color images will be obtained and all other color images will be effectively dropped out. We have discovered that even though the several monochromatic fluorescent colors photograph at different speeds, standard color filters will filter out other colors so effectively that the difference in photographic speeds of the several fluorescent colors is immaterial and the obstacle usually presented in color separation by the differences in photographic speeds of these colors is avoided.

An advantage of our invention is that the several color images by our process of separating colors are registered as positives on the color printers, whereas the usual complementary filter color separation process registers the color images as negatives on the color printers. Consequently, our process eliminates the step of changing the color image from a negative to positive required heretofore in most photo-mechanical methods of producing printing plates from color printers.

A still further advantage of our process is that in line work we may cause one line to "drop out" where lines of different colors intersect, thus aiding in registering the several colors when printing.

Other and further objects and advantages of our invention will be apparent from the following specification, claims and drawings, in which:

Fig. 1 is a diagram showing the separation of primary fluorescing colors;

Fig. 2 is a representation (shaded for color where possible) of an original rendering of a portion of a map in fluorescent colored mediums and a non-fluorescent black medium;

Fig. 3 is a representation of a blue color printer taken from the rendering shown in Fig. 2;

Fig. 4 is a representation of a green printer taken from the rendering shown in Fig. 2;

Fig. 5 is a representation of a red printer taken from the rendering shown in Fig. 2; and Fig. 6 is a black printer taken from the rendering shown in Fig. 2.

In general, our process consists in rendering an original of the subject matter to be reproduced with a palette of a medium carrying several fluorescent agents, usually dyes, which fluoresce with distinctive substantially monochromatic colors under ultra-violet light. The palette may also contain a non-fluorescent black in order to permit the artist to "point up" the original rendering as well as to show desired areas of the original rendering in black. The medium of the fluorescent palette may be any suitable medium, such as water color, oil, air-brush lacquer, or the like. Each color of the palette should contain a sufficient proportion of a fluorescent agent to cause the color to fluoresce brilliantly under ultra-violet light, but the relative proportions of the fluorescent agent in the several colors of the palette is immaterial.

If the original rendering is to be viewed under daylight, i. e., normal visible lighting conditions, as for example, where an advertising sketch is prepared for sale to a client, the artist preparing the original will usually work under daylight lighting conditions and the several colors in the palette will preferably have approximated true subtractive colors. Thus, the client to whom the original rendering is to be sold will obtain a good idea of how the original will appear when reproduced. In such cases, it may be that one or more of the distinctively fluorescing agents in the several colors of the palette may not have a good daylight, or subtractive color. Consequently, it may be necessary to add to such colors suitable non-fluorescent pigments or dyes to correct the subtractive color of a color in the palette. Thus, for example, an agent which fluoresces a brilliant blue may be substantially invisible under visible lighting conditions; to correct this condition, a suitable non-fluorescent blue pigment may be added to provide a satisfactory subtractive blue in the palette.

If the original rendering is not designed to be viewed under daylight, then the artist may prepare the original rendering under filtered ultra-violet light, in which event the daylight color of the several colors in the palette is immaterial, but the fluorescent color of the colors in the palette should be approximately true in order to permit the artist to prepare a true rendering of the subject matter to be reproduced. This is in contradistinction to a palette for daylight use, when the daylight colors should be true but the fluorescent colors may be "off." In either case, the important point is that the several colors of the palette should fluoresce with distinctive substantially monochromatic colors. Furthermore, it is also to be understood that an experienced artist who knows the color values of the inks which the printer will employ will automatically allow for variations between the color values of his palette and the color values of the inks in which the original rendering is to be reproduced, the important advantages of our process to both the artist and printer being the accurate photographic separation of colors obtained.

After the original is rendered, it is photographed under filtered ultra-violet and, by use of suitable direct color filters which absorb ultra-violet light reflected by the rendering and the visible colors emitted by the rendering, other than the color which the filter transmits, sharp positives of the color images sought will be registered on the color printers. Thus, as shown diagrammatically in Fig. 1, if a color card of the primary additive fluorescing colors is photographed under filtered ultra-violet light through a blue filter, only a sharp, dense, and full black positive of the blue color image will be obtained on the blue printer. Similarly, dense black positives of the green and red color images will be obtained when the color card is photographed through green and red filters, respectively. On the green and red printers a very light gray shadow of the other primary colors may be registered. Such very faint shadow images are probably due to the fact that the present green and red filters are not perfect monochromatic color filters and possibly because the fluorescent agents are not absolutely perfectly monochromatic. By exercising reasonable care in the selection of fluorescent agents and color filters, however, such shadow images are so faint that they will drop out completely in a deep etch or other photo-mechanical method of producing a printing plate.

After the color printers are obtained, mechanical printing plates are prepared by any suitable photo-mechanical process from the color printers. The reproductions are then run from the printing plates in any suitable color press, the printer exercising the usual care in maintaining the printing plates in register and in selecting the desired colored inks for each of the printing plates. It is to be understood that while the printer ordinarily selects his colored inks to match the corresponding colors in the original, the printer may, if directed, select any color for the several plates if it is desired to vary the color images in the reproduction from the color images in the original.

For simplicity of illustration, the following example of the reproduction of a line drawing is given as a specific example of the foregoing general description of our process. It is to be understood that the following example is not to be construed as limitative in any way.

*Example 1*

Fig. 2 shows a section of a map prepared on a good non-fluorescent drawing paper with suitable colored inks which possess substantially true daylight colors and fluoresce brilliantly and distinctively under filtered ultra-violet light. As shown in Fig. 2, the lake, stream, and contour lines are drawn in a blue lacquer ink, such as Conti-Glo "Horizon Blue" No. 276. The daylight visible blue color of this particular ink is due to a non-fluorescent blue pigment and the fluorescent blue color to a fluorescent agent which is substantially invisible. The subtractive effect of the non-fluorescent pigment in the ink will be described below. The dock building shown in Fig. 2 is drawn in a green lacquer ink, such as Conti-Glo "Saturn Green" No. 268. The road shown in Fig. 2 is drawn in a red lacquer ink, such as Conti-Glo "Neon Red" No. 226. The lettering and the outline of the edge of the lake and stream is drawn in a good non-fluorescent black india ink.

The original sketch shown is then photographed under a filtered ultra-violet light source, such as four 30-ampere carbon arcs, each filtered through a Corning 587 filter. A camera having a twenty-one inch apochromatic lens is set at a distance of twenty-six inches from the edge of the sketch. Employing a stop 16 and Eastman CTC panchromatic film for all color printers, the blue printer shown in Fig. 3 is obtained by employing Wratten filters Nos. 50 and 2A in the camera and exposing for four minutes, the green printer as shown in Fig. 4 is obtained by employing a Wratten filter No. 61 and exposing for one and one-half minutes, and the red printer is obtained by employing a Wratten filter No. 29 and exposing for four minutes. All color printers are suitably developed in one and one-half minutes in an Eastman D-8 developer, for example. To obtain a black printer, as shown in Fig. 6, either the well-known infra-red procedure may be followed or a photograph of the sketch under white light may be made to obtain a conventional black and white negative. If a conventional black and white negative is made, the color printers as shown in Figs. 3, 4, and 5 are employed as masks for the negative and a positive black printer as shown in Fig. 6 is then made from the masked negative.

As shown in Fig. 3, the blue printer will be a sharp black and white positive of the blue image in the original sketch. Even when the blue printer is exposed to obtain a very dense and opaque black positive image, no false images of the other colors are obtained, since the No. 50 Wratten filter apparently completely absorbs the green and red light emitted by the sketch and the No. 2A Wratten filter absorbs any ultra-violet light which may be reflected by the sketch. In the lower portion of Fig. 3, a break will be noted where the blue contour line intersects the stream. This break is caused by the masking and subtractive effect of the black ink used to outline the edge of the stream. Such a drop-out in the blue image is not objectionable, however, but is usually desirable for ascertaining register of the printing plates.

As shown in Fig. 4, the green color image appears in a dense black, but very light gray images of the red and blue images may also appear. Such shadow images, also apparent in Fig. 5, are somewhat exaggerated for purposes of illustration to show that our process of color separation, while it may not be absolutely perfect, is satisfactory for substantially all practical purposes. Such shadow images are so light that they drop out in the photo-mechanical production of plates from the color printers. Thus, color printers made by our process do not require retouching to eliminate false and shadow images when a dense black image of the color image is obtained. If the density of the shadow or "ghost" images should prove objectionable, then the density of the ghost images may be reduced by shortening the exposure time, by selecting fluorescent inks which exhibit narrower ranges of monochromaticity, or by employing both procedures.

In Fig. 5 it will be noted that there is a break and partial drop-out of the dense black red color image where a blue contour line intersects the red road. This drop-out is caused by the absorptive effect of the subtractive blue pigment in the blue line, i. e., the red light emitted by the red fluorescent ink was absorbed by the subtractive blue pigment in the blue contour line. Such drop-out is not objectionable but actually assists in obtaining register. Where two colored lines in which both inks are "loaded" with subtractive pigments intersect, however, a double drop-out may be produced, in which case one printer may have to be retouched, which is a simple and rapid operation which may be performed by an ordinary artisan in line work. Therefore, while a double drop-out should be avoided by proper selection of inks, if it does occur, it is not particularly objectionable.

In all the color printers, it should be noted that no false or shadow images are found in the white areas of the original and thus no "highlight scum" will be produced in the reproductions. This is of great importance, particularly in line work, where the problem of eliminating "highlight scum" was often so great that in map work, for example, separate color images were produced by manual copying in preference to attempting to separate the colors photographically.

Printing plates may be produced from the color printers by any suitable method, such as, for example, a deep etch process for lithographing the reproductions. In line work, the matching of colors in the printed reproduction with the original is generally unimportant. Thus, the image shown in the green printer could be printed in yellow ink or any other desired color.

In order to aid the printer in registering the several color printing plates, the artist may draw register lines (not shown) in the margin of the original rendering in ink which fluoresces white under ultra-violet light. Such white register lines will be reproduced in the margin of each color printer and also in the margin of each color plate. A suitable fluorescent white lacquer ink may be Conti-Glo Pearl White No. 204.

*Example 2*

To produce colored reproductions in tones and shades, rather than line work, as illustrated in Example 1, the original is preferably prepared by the artist under filtered ultra-violet light in order to avoid the use of fluorescent inks "loaded" with subtractive pigments. Thus, the artist may prepare an original from a palette having Conti-Glo "Invisible Blue" No. 294, "Saturn Green" No. 268, and "Neon Red" No. 226 as the primary colors. From these primary colors, substantially all fluorescent shades and tints may be produced, as set forth at length in our copending applications Nos. 222,676 and 366,432, now U. S. Patents 2,277,169 and 2,302,645. The original is then photographed under filtered ultra-violet light through suitable direct color filters and tone screens to produce the several color printers desired. Because the colors in the palette are not "loaded" with subtractive pigments, the values of the primary colors in the several color printers will not be substantially distorted in areas where a tint of a plurality of the primary colors is to be reproduced. The "shadow" images indicated in the line color printers, Figs. 4 and 5, will either be so broken up by the tone screens that they will not register on the tone printers or the dots will be so fine that they will drop out in the photo-mechanical production of the printing plates and, therefore, do not need to be touched out of the tone color printers. In printing reproductions from the printing plates obtained by our method, the printer will, of course, be required to exercise his customary care and skill in selecting his printing inks to match the primary colors of the originals and in selecting the order of overlaying the several colored inks to allow for the relative opacity of the inks.

*Example 3*

This general method is not, of course, limited to the reproduction of originals in subtractive colors for viewing under visible light but may be employed for fluorescent reproductions to be viewed under filtered ultra-violet light. An original may be prepared in a fluorescent medium and then photographed under filtered ultra-violet light, the several color printers being obtained by employing suitable color filters in the manner described in the two preceding examples. The printing plates are then produced from the color printers by any suitable process. In the case of tone work, the printer must exercise care in selecting his fluorescent printing inks and in overlaying the printed fluorescent inks to produce fluorescent tints and shades, as described at length and detail in Example 2 of our copending applications Nos. 222,676 and 366,432, now U. S. Patents 2,277,169 and 2,302,645.

From the foregoing, it should be apparent that our process is not limited to either line work only or tonal reproductions only but that by producing some color printers in lines, other color printers in tones, and further color printers in combinations well-known to the art, reproductions in all combinations of line and tone may be obtained. Furthermore, by printing some colors in fluorescent inks and other colors in non-fluorescent inks, reproductions produced in both non-fluorescent and fluorescent inks may be obtained. Also, while filtered ultra-violet light is the most convenient and preferred source of fluorescigenous radiation, other invisible fluorescigenous radiations, such as X-ray, may be employed. Further, it is to be understood that the fluorescent agents employed in the mediums in which the originals are rendered are not to be considered to be limited to agents which are fluorescent only but may include agents which are also phosphorescent. It is to be understood, therefore, that this invention is not limited to the particular examples or embodiments disclosed, but may be varied and modified within the limits of the following claims.

What is claimed is:

1. The method of making reproductions of original compositions comprising the steps of preparing an original in a luminescent medium, lighting the original with substantially only fluorescigenous radiations, photographing the original only while it is luminous through a color filter selected to transmit a color of the luminous original to produce a color printer, producing a printing plate from the color printer, and printing a reproduction from said printing plate.

2. The method of making reproductions of an original composition comprising the steps of preparing an original frrom a palette which is luminescent in distinctive colors, exposing the original in the substantial absence of visible light to activating radiations, successively photographing the original only while it is luminous through color filters selected to transmit different colors of the luminous original to obtain a plurality of color printers, producing printing plates from said color printers, and printing a reproduction from said printing plates.

3. In the art of printing reproductions of an original composition, the method of separating a color from the original comprising the steps of preparing an original in a luminescent medium, and photographing the luminous original in the substantial absence of visible light through a color filter selected to transmit a color of the luminous original to obtain a color printer.

4. In the art of printing reproductions of an original colored composition, the method of separating colors in the original comprising the steps of preparing an original from a palette in which a plurality of colors luminesce with distinctive luminescent colors, and, in the substantial absence of visible light, photographing the luminous original successively through color filters selected to transmit different colors of the luminescent original to obtain a plurality of color printers.

5. In the art of printing reproductions of an original colored reproduction, the method of separating colors comprising the steps of preparing an original from a palette in which a plurality of colors fluoresce to emit different ranges of visible light, thereby producing mutually spectrally separable colors, and successively photographing the original, under substantially invisible fluorescigenous radiations only, through a plurality of color filters, each selected to pass substantially only one color of the fluorescent original to obtain color printers of the separate color images of said original.

6. In the art of printing reproductions of colored original compositions, the method of separating colors comprising the steps of preparing an original from a palette in which the several colors fluoresce to emit different ranges of visible light and in which the black is non-fluorescent, obtaining color printers by the method defined in claim 5, and obtaining a black printer by photographing the original under infra-red radiation.

7. In the art of printing reproductions of colored original compositions, the method of separating colors comprising the steps of preparing an original from a palette in which the several colors fluoresce in distinctive substantially monochromatic colors and in which the black is non-fluorescent, obtaining color printers by the method defined in claim 5, photographing the original under visible white light to obtain a negative of the original, masking said negative with said colorprinters, and photographing said masked negative to obtain a black printer.

8. In the art of printing reproductions of colored original compositions in which selected colors appear in lines and blocks, the method of separating colors comprising the steps of preparing the original by delineating the desired lines and blocks from a palette in which at least one color fluoresces under fluorescigenous radiations, and photographing the original under substantially invisible fluorescigenous radiation only through a color filter selected to transmit a fluorescent color of the palette to obtain a color printer of the selected color image in lines and blocks.

9. In the art of printing reproductions of a colored original composition in which selected colors appear in lines and blocks, the method of separating colors comprising the steps of preparing the original from a palette, in which the several colors fluoresce to emit different ranges of visible light, thereby producing mutually spectrally separable colors, delineating selected areas of the original in one color of the palette and delineating other selected areas in another color of said palette, and successively photographing the original under substantially invisible fluorescigenous radiations only through color filters selected to transmit substantially only one color of the fluorescent original to obtain color printers for each of the colors in the original.

10. In the art of reproducing original compositions in which selected areas comprising lines and blocks appear in distinctive colors and black, the method of separating colors comprising the steps of obtaining color printers as defined in claim 9, and photographing the original under infra-red radiation to obtain a black printer.

11. In the art of reproducing original compositions in which selected areas comprising lines and blocks appear in distinctive colors and black, the method of separating colors comprising the steps of obtaining color printers as defined in claim 9, photographing the original under visible light to obtain a negative of the original, masking said original with said color printers, and photographing said masked negative to obtain a black printer.

12. In the art of reproducing colored original compositions in which a color appears in tones and shades, the method of separating colors comprising the steps of preparing the original from a palette in which a primary color fluoresces in a distinctive substantially monochromatic color and contains substantially no subtractive color agent, and photographing the original under substantially invisible fluorescigenous radiations, only, through a tone screen and a color filter selected to transmit substantially only one primary color of said palette to obtain a color printer of the color image transmitted by said color filter.

13. In the art of reproducing colored original compositions in which the colors appear in tones and shades, the method of separating colors comprising the steps of preparing the original from a palette in which the primary colors fluoresce in distinctive mutually spectrally separable colors due to emission of different ranges of visible light by the fluorescent primary colors, and successively photographing the original under substantially invisible fluorescigenous radiations only, through a tone screen and color filters, each selected to transmit substantially only one of the primary colors in said palette to obtain color printers of the primary color images in said original.

14. In the art of reproducing colored original compositions in which a color appears in tones and shades, the method of separating colors comprising the steps of preparing the original from a palette in which a primary color fluoresces in a distinctive substantially monochromatic color and contains substantially no subtractive color agent, and photographing the original under substantially invisible fluorescigenous radiations, only, through a color filter selected to transmit substantially only one primary color of said palette to obtain a color printer of the color image transmited by said color filter.

15. In the art of reproducing colored original compositions in which the colors appear in tones and shades, the method of separating colors comprising the steps of preparing the original from a palette in which the primary colors fluoresce in distinctive mutually spectrally separable colors due to emission of different ranges of visible light by the fluorescent primary colors, and successively photographing the original under substantially invisible fluorescigenous radiations only, through color filters, each selected to transmit substantially only one of the primary colors in said palette to obtain color printers of the primary color images in said original.

16. In the art of reproducing colored original compositions in which a color appears in tones and shades, the method of separating colors comprising the steps of preparing the original from a palette in which a primary color fluoresces in a distinctive substantially monochromatic color and contains substantially no subtractive color agent, photographing the original under substantially invisible fluorescigenous radiations, only, through a color filter selected to transmit substantially only one primary color of said palette to obtain a continuous tone color printer of the color image transmitted by said color filter, and then photographing said continuous tone color pritner through a tone screen to produce a fractional tone color printer.

17. In the art of producing a fluorescent colored reproduction of an original composition, the method of separating colors comprising the steps of preparing the original from a palette in which at least one color fluoresces under fluorescigenous radiation, photographing the original under substantially invisible fluorescigenous radiation only through a color filter selected to transmit substantially only one selected fluorescent color to obtain a color printer, and then preparing a printing plate from said color printer and printing in a fluorescent ink a reproduction of the color image separated from the original.

JOSEPH L. SWITZER.
ROBERT C. SWITZER.

REFERENCES CITED

The following references are of record in the file of this patent:

UNITED STATES PATENTS

| Number | Name | Date |
|---|---|---|
| 2,319,079 | Murray et al. | May 11, 1943 |
| 2,008,290 | Murray | July 16, 1935 |
| 2,278,114 | Murray et al. | Mar. 31, 1942 |
| 2,108,503 | Murray | June 19, 1935 |
| 1,099,710 | Mannich | June 9, 1914 |
| 2,161,378 | Murray | June 6, 1939 |
| 2,286,779 | Yule | June 16, 1942 |
| 2,286,780 | Yule | June 16, 1942 |
| 2,277,169 | Switzer | Mar. 24, 1942 |
| 2,161,399 | Yule | June 6, 1939 |
| 2,191,939 | Marx, Jr. | Feb. 27, 1940 |

FOREIGN PATENTS

| Number | Country | Date |
|---|---|---|
| 308,375 | Great Britain | June 23, 1930 |
| 308,376 | Great Britain | June 23, 1930 |